(12) United States Patent
Miyakawa et al.

(10) Patent No.: US 9,897,866 B2
(45) Date of Patent: Feb. 20, 2018

(54) LIQUID CRYSTAL DISPLAY AND METHOD FOR MANUFACTURING THE SAME

(71) Applicant: Mitsubishi Electric Corporation, Tokyo (JP)

(72) Inventors: Osamu Miyakawa, Kumamoto (JP); Fumihiro Goto, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/402,345

(22) Filed: Jan. 10, 2017

(65) Prior Publication Data

US 2017/0212379 A1    Jul. 27, 2017

(30) Foreign Application Priority Data

Jan. 25, 2016    (JP) ................................ 2016-011333

(51) Int. Cl.

| G02F 1/1335 | (2006.01) |
|---|---|
| G02F 1/1339 | (2006.01) |
| G02F 1/1368 | (2006.01) |
| G02F 1/1362 | (2006.01) |
| G02F 1/1333 | (2006.01) |
| G02F 1/1343 | (2006.01) |
| G02F 1/136 | (2006.01) |

(52) U.S. Cl.
CPC ........ *G02F 1/13394* (2013.01); *G02F 1/1368* (2013.01); *G02F 1/133345* (2013.01); *G02F 1/134309* (2013.01); *G02F 1/136227* (2013.01); *G02F 1/136286* (2013.01); *G02F 2001/13606* (2013.01); *G02F 2001/13629* (2013.01); *G02F 2001/133357* (2013.01); *G02F 2201/121* (2013.01); *G02F 2201/123* (2013.01)

(58) Field of Classification Search
CPC ......... G02F 1/133345; G02F 1/136213; G02F 1/13394

See application file for complete search history.

(56) References Cited

U.S. PATENT DOCUMENTS

| 7,385,666 B2 | 6/2008 | Ashizawa et al. |
|---|---|---|
| 7,773,189 B2 | 8/2010 | Ashizawa et al. |
| 7,872,725 B2 | 1/2011 | Ashizawa et al. |
| 8,314,915 B2 | 11/2012 | Ota |
| 8,405,813 B2 | 3/2013 | Ashizawa et al. |
| 8,724,072 B2 | 5/2014 | Ashizawa et al. |
| 9,069,213 B2 | 6/2015 | Ashizawa et al. |
| 2015/0261031 A1 | 9/2015 | Ashizawa et al. |
| 2016/0062193 A1 | 3/2016 | Yamayoshi et al. |

FOREIGN PATENT DOCUMENTS

| JP | 2005-128357 A | 5/2005 |
|---|---|---|
| JP | 3925142 B2 | 6/2007 |
| JP | 2009-271389 A | 11/2009 |
| JP | 2010-008758 A | 1/2010 |
| JP | 2016-051093 A | 4/2016 |

*Primary Examiner* — Phu Vu

(74) *Attorney, Agent, or Firm* — Studebaker & Brackett PC

(57) ABSTRACT

A liquid crystal display includes a first insulation substrate and a second insulation substrate on which a first pixel, a second pixel, and a third pixel are located. In the first pixel, no columnar spacer equivalent to a first columnar spacer or the second columnar spacer is provided. In the second pixel, a second interlayer insulation film has no contact hole below the first columnar spacer. In the third pixel, no common wire is provided and a third interlayer insulation film has no contact hole below the second columnar spacer.

10 Claims, 11 Drawing Sheets

F I G. 1
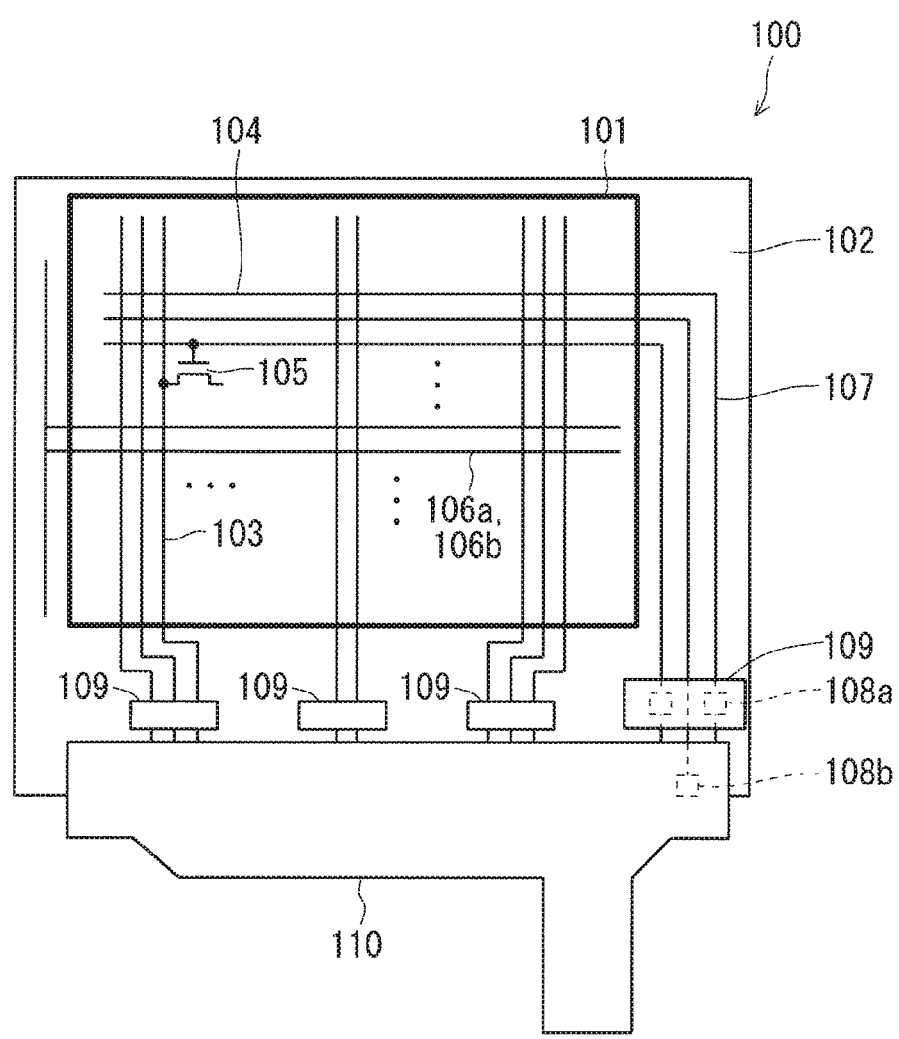

F I G . 5
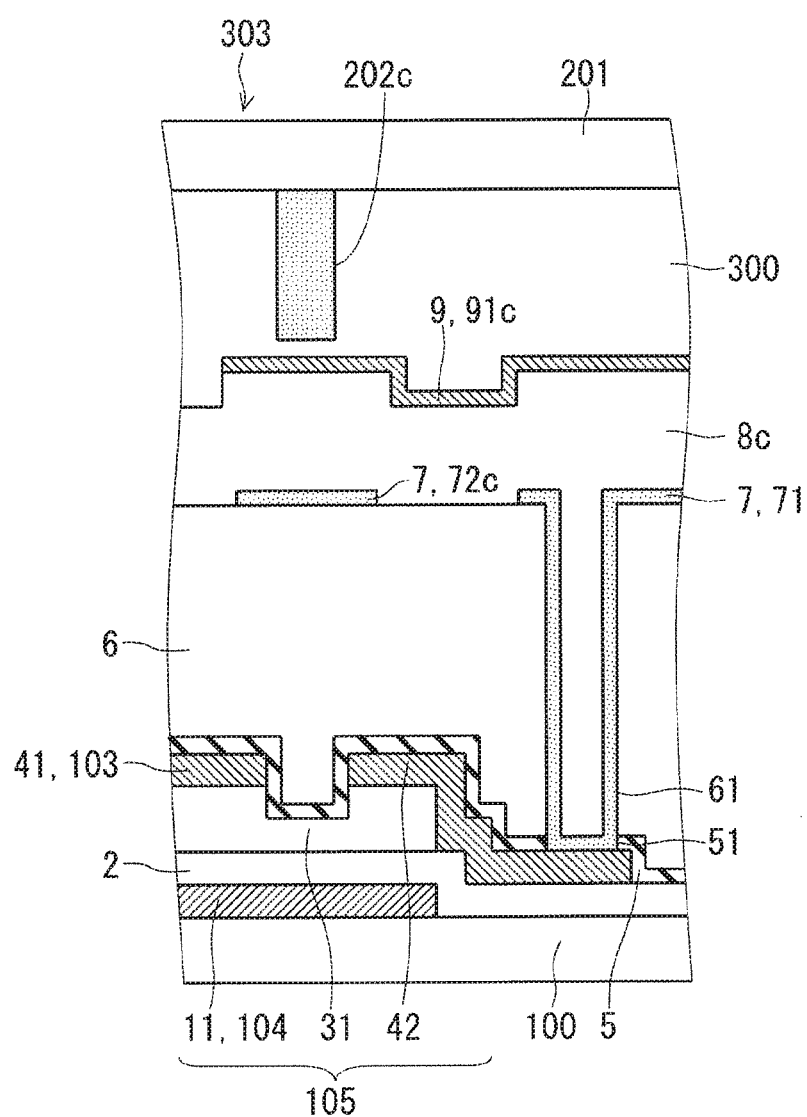

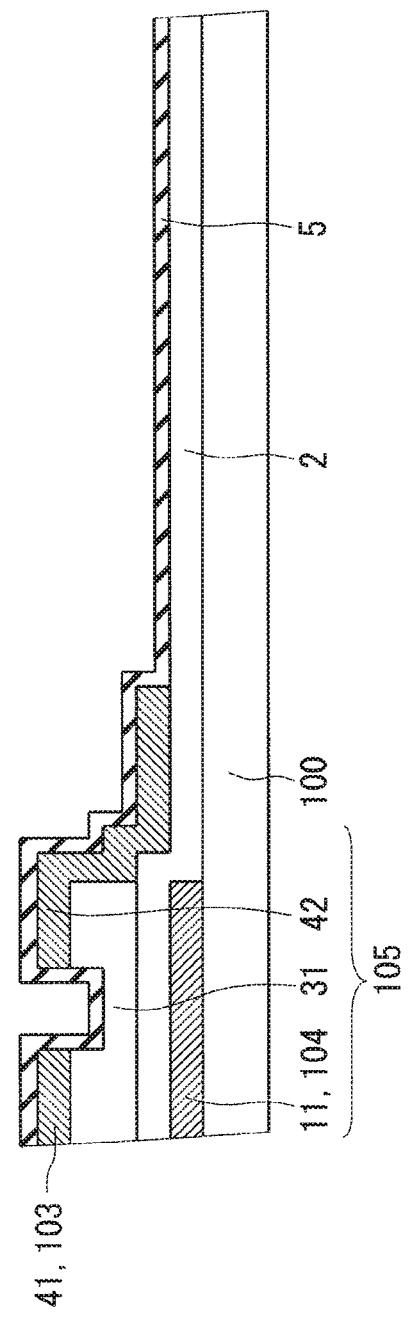
F I G . 7

F I G. 1 1
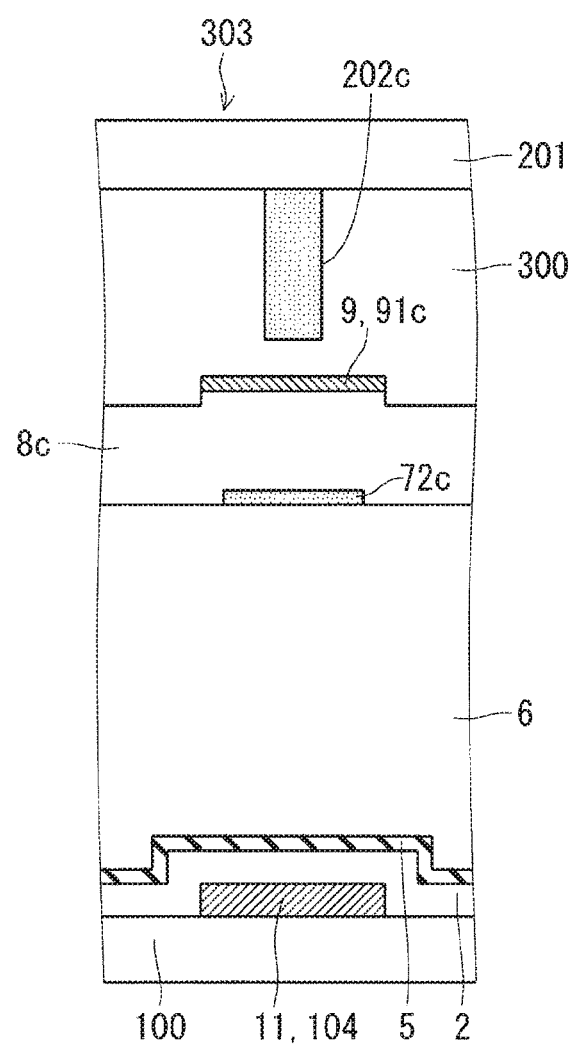

LIQUID CRYSTAL DISPLAY AND METHOD FOR MANUFACTURING THE SAME

BACKGROUND OF THE INVENTION

Field of the Invention

The present invention relates to a liquid crystal display and a method for manufacturing the same.

Description of the Background Art

The common type of display method for use in liquid crystal displays has been the twisted nematic (TN) mode. Meanwhile, a transverse electric field type has been proposed in which voltage is applied between a pixel electrode and common counter electrodes (hereinafter also referred to as a "counter electrode" and a "common electrode") to generate an approximately horizontal electric field in a panel and to drive liquid crystal molecules in a horizontal direction accordingly. The transverse electric filed mode has advantages in wide viewing angle, high definition, and high brightness, thus becoming mainstream for use especially in small-to-medium panels typified by smartphones and tablets. Known examples of the transverse electric field type include the in-plane switching (IPS)™ mode and the fringe field switching (FFS) mode. Specifically, a liquid crystal display employing the FFS mode includes a lower electrode and an upper electrode that is located on the lower electrode with an insulation film therebetween and has slits. One of the electrodes serves as a pixel electrode, whereas the other electrode serves as a counter electrode. Roughly speaking, an electric field for driving liquid crystals in such a configuration is generated in a manner to extend from the slits of the upper electrode toward liquid crystals above the upper electrode, to turn sideways in the liquid crystals, and then to extend toward the slits of the upper electrode.

A typical liquid crystal display includes a first substrate (a first insulation substrate) and a second substrate (a second insulation substrate) disposed to provide a certain amount of space therebetween and also includes a liquid crystal layer sandwiched between the first substrate and the second substrate. Provided in pixel areas on the first substrate side of the liquid crystal display employing the FFS mode are a plurality of signal lines, a plurality of scanning lines orthogonal to the signal lines, a plurality of thin film transistors located at intersections of the signal lines and the scanning lines, a pixel electrode, and a common electrode. Provided on the second substrate are a black matrix layer and a color filter layer. The black matrix layer blocks entry of light into the areas other than the pixel areas. The color filter layer is located on the portions of the second substrate corresponding to the individual pixel areas and consists of red (R), green (G), and blue (B) colors to produce the hue.

The first substrate of the liquid crystal display employing the FFS mode includes, in a display area of each pixel, a thin film transistor on a lower layer below the upper electrode and the lower electrode, with a protective insulation film located between the thin film transistor and these electrodes. Any given signal (voltage) from the outside is transmitted through the signal line to the thin film transistor, and then, is applied to the lower electrode or the upper electrode through a contact hole of the protective insulation film. The display area of each pixel corresponds to the area in which the upper electrode and the lower electrode overlap each other. A non-display area of each pixel corresponds to the area including the thin film transistor, the signal line, the scanning line, a common wire for reducing the resistance of the common electrode and the resistance distribution. The aperture ratio of the display area decreases with increasing proportion of the non-display area in each pixel, becoming difficulties in the production of high definition liquid crystal display. It is desired that the non-display area be minimized in order to achieve high definition.

Parasitic capacitance exists in this structure because the protective insulation film is sandwiched between the lower electrode and the signal lines. The parasitic capacitance may degrade the display quality. Thus, a liquid crystal display panel has been proposed in which an insulation film capable of reducing the parasitic capacitance is located on a lower layer below the lower electrode (Japanese Patent Application Laid-Open No. 2010-008758). The insulation film is an organic film having a small relative dielectric constant and a greater thickness. The organic film has excellent planarization properties, and thus, can smooth out irregularities caused by the thin film transistors. The organic film (hereinafter also referred to as an "organic planarization film") may be photosensitive such that contact holes can be formed in the film in a photolithography process.

The liquid crystal display also includes spacers sandwiched between the first substrate and the second substrate and located in the non-display area. The spacers maintain a certain distance in the portion in which the liquid crystal layer is sealed. There are two types of spacers being a bead spacer and a columnar spacer. The bead spacers are spherical particles (beads) and distributed over the above-mentioned area, whereas the columnar spacers are fixed to the first substrate or the second substrate.

The beads spacers tends to move relatively freely after the first substrate and the second substrate are attached (bonded) to each other, so that some of the beads spacers may be mixed into the liquid crystals in the pixels. Consequently, the arrangement of the liquid crystal molecules around the spacers is disturbed, causing leakage of light in the relevant area. Unfortunately, this may reduce contrast and degrade the quality accordingly.

Unlike the beads spacers, the columnar spacers, which are fixed to the first substrate or the second substrate, do not reduce contrast. However, the liquid crystal display including sparsely arranged columnar spacers may fail to maintain the gap below the display surface touched by a hand or the like, causing irregularities. The restoration of the original state is time-consuming In the liquid crystal display including densely arranged columnar spacers, meanwhile, contraction of liquid crystals at a low temperature may not be accommodated by the distortion of the columnar spacers, so that a negative pressure may be applied to the inside of the liquid crystal panel. This may lead to low-temperature foaming. To eliminate the local distortion caused by an excessive load and the contraction of liquid crystals at a low temperature, a technique has been proposed (as disclosed in, for example, Japanese Patent No. 3925142) which uses two or more types of columnar spacers of different heights, such as main columnar spacers and sub columnar spacers, to keep the gap between the substrates.

The liquid crystals are aligned in alignment processing such as rubbing. This alignment processing is affected by steps caused by the columnar spacers, so that a leakage of light may occur and the alignment processing cannot be properly performed in some areas, namely, alignment abnormality areas. To eliminate or reduce the occurrence of these events, a technique has been proposed which uses columnar spacers placed in a light-shielding area (a non-display area).

In the above-mentioned configuration including the main columnar spacers and the sub columnar spacers of different heights as disclosed in Japanese Patent No. 3925142, some of these columnar spacers have larger diameters. In a high-definition liquid crystal panel, the alignment abnormality areas around the columnar spacers having larger diameters extend to a pixel display area, thereby causing degradation of quality, such as leakage of light and lower contrast.

Another technique has been proposed which uses a half-tone (HT) mask or a gray-tone (GT) mask as a photomask for forming columnar spacers. These masks enable control of the heights of columnar spacers based on the exposure value corresponding to the transmittance, so that columnar spacers having smaller diameters and different heights can be formed. Unfortunately, the production of the HT mask and the GT mask takes a longer period of time, thus causing a delay in starting the manufacturing of desired liquid crystal displays. The production of these masks involves complicated processes, which drive up costs of masks. This translates into an increase in the cost of liquid crystal displays (especially, the first substrate or the second substrate).

SUMMARY OF THE INVENTION

The present invention has an object to provide a technique for forming columnar spacers similar to the above-mentioned columnar spacers of different heights.

The present invention is a liquid crystal display including a liquid crystal layer, a first insulation substrate, and a second insulation substrate. The first insulation substrate and the second insulation substrate sandwich the liquid crystal layer and include a first pixel, a second pixel, and a third pixel located thereon. Each of the first pixel, the second pixel, and the third pixel includes one of a plurality of signal lines, one of a plurality of scanning lines, a thin film transistor, a planarization film having insulation properties, and a pixel electrode. The plurality of signal lines and the plurality of scanning lines are arranged in matrix on the first insulation substrate. The thin film transistor is located at an intersection of the signal line and the scanning line and is electrically connected to the signal line and the scanning line. The planarization film is located on the thin film transistor. The pixel electrode is located on the planarization film and is electrically connected to the thin film transistor through a contact hole of the planarization film. The first pixel also includes a first common wire, a first interlayer insulation film, and a first common electrode. The first common wire is located on the planarization film and overlaps the scanning line in a plan view. The first interlayer insulation film is located on the pixel electrode and the first common wire. The first common electrode is located on the first interlayer insulation film and is electrically connected to the first common wire through a contact hole of the first interlayer insulation film. The second pixel also includes a second common wire, a second interlayer insulation film, a second common electrode, and a first columnar spacer. The second common wire is located on the planarization film and overlaps the scanning line in a plan view. The second interlayer insulation film is located on the pixel electrode and the second common wire. The second common electrode is located on the second interlayer insulation film. The first columnar spacer is located above at least one of the thin film transistor, the signal line, and the scanning line and is connected to at least one of the second common electrode and the second insulation substrate. The second interlayer insulation film has no contact hole below the first columnar spacer. The third pixel includes also includes a third interlayer insulation film, a third common electrode, and a second columnar spacer. The third interlayer insulation film is located on the pixel electrode. The third common electrode is located on the third interlayer insulation film. The second columnar spacer is located above at least one of the thin film transistor, the signal line, and the scanning line and is connected to the third common electrode or the second insulation substrate. The third pixel includes no common wire equivalent to the first common wire or the second common wire below the second columnar spacer. The third interlayer insulation film has no contact hole below the second columnar spacer. The first pixel includes no columnar spacer equivalent to the first columnar spacer or the second columnar spacer.

Thus, the columnar spacers similar to the columnar spacers having different heights can be formed without using a special HT mask or GT mask.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a plane view of a configuration of a liquid crystal display panel according to a first preferred embodiment;

FIG. 5 is a cross-sectional view of a configuration of a third pixel of the liquid crystal display panel according to the first preferred embodiment;

FIGS. 6 to 9 are cross-sectional views illustrating a method for manufacturing the liquid crystal display panel according to the first preferred embodiment;

FIG. 11 is a cross-sectional view of a configuration of the third pixel of the liquid crystal display panel according to the modification.

DESCRIPTION OF THE PREFERRED EMBODIMENT

First Preferred Embodiment

Figure 2:
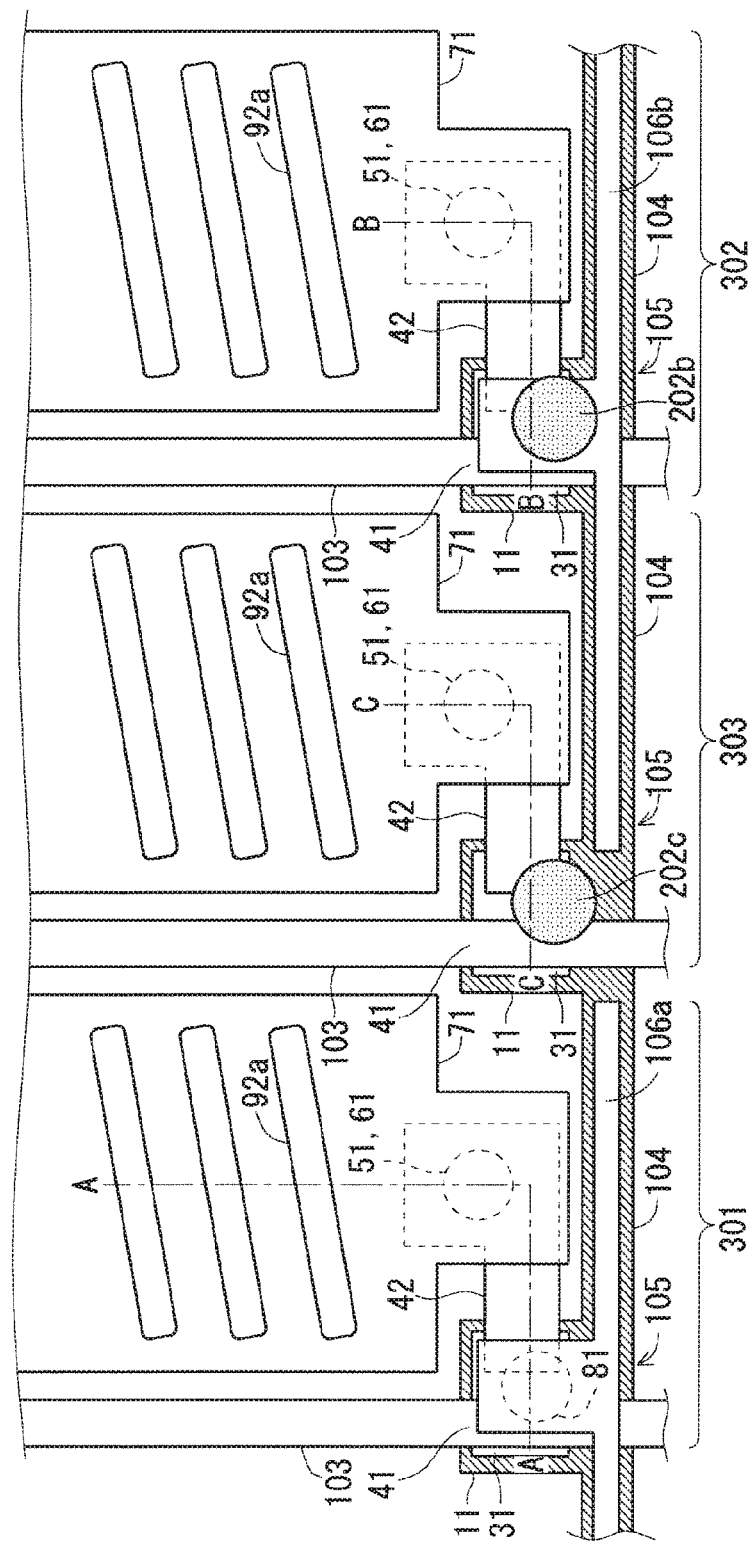
FIG. 2 is a plane view of a configuration of each pixel of the liquid crystal display panel according to the first preferred embodiment.

A first preferred embodiment of the present invention will now be described assuming that the present invention is applied to a liquid crystal display including a common liquid crystal display panel employing the FFS mode. FIG. 1 is a plane view of the liquid crystal display panel. FIG. 1 is merely a schematic view and does not reflect the exact size and the like of constituent elements illustrated therein. To eliminate complexity, FIG. 1 omits components other than the main part of the present invention and simplifies part of the configuration as appropriate. This holds true for the subsequent drawings. In the subsequent drawings, each constituent element identical or similar to the corresponding one of the elements illustrated in any one of the previous drawings is denoted by the same reference sign and the description thereof may not be repeated.

As illustrated in FIG. 1, the liquid crystal display panel employing the FFS mode includes a transparent insulation substrate (first insulation substrate) 100. In the transparent insulation substrate 100, a display area 101 in which an image is displayed and a frame area 102 surrounding the display area 101 are defined.

In the frame area 102, external wires 107 extending from the display area 101 are connected to a plurality of terminal electrodes 108a and 108b for external connection. The terminal electrodes 108a and 108b lie on the extension of the external wires 107. The terminals 108a and 108b have relatively large areas. The surfaces of the terminal electrodes 108a are connected with terminals of the corresponding one of integrated circuit (IC) chips 109 through bumps. Similarly, the surface of the terminal electrode 108b is connected with a printed circuit board 110 through an anisotropic conductive film (ACF).

On the transparent insulation substrate 100 in the display area 101, a plurality of signal lines 103 and a plurality of scanning lines 104 are arranged in matrix. For example, the signal lines 103 and the scanning lines 104 are disposed so as to intersect at right angles. A plurality of common wires (a first common wire 106a and a second common wire 106b, which will be described below) extend in parallel with the scanning lines 104. A plurality of pixels are arranged in matrix, with each pixel being defined by two adjacent signal lines 103 and two adjacent scanning lines 104.

FIG. 2 is an enlarged plan view of pixel areas in the display area 101 illustrated in FIG. 1. As illustrated in FIG. 2, provided in the display area 101 are a first pixel 301, a second pixel 302, and a third pixel 303. FIG. 2 omits a common electrode while illustrating slits (such as slits 92a) of the common electrode.

Figure 3:
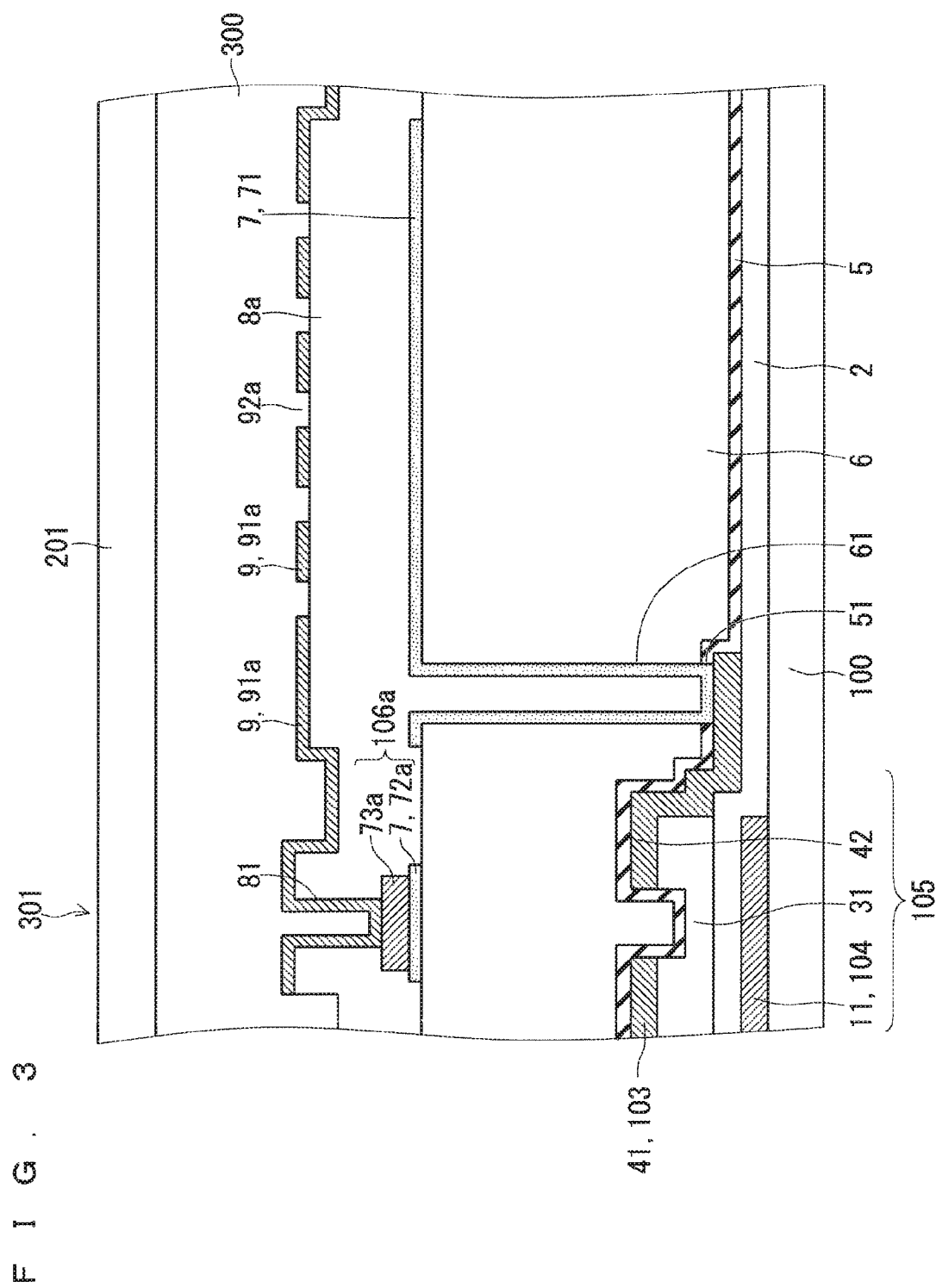
FIG. 3 is a cross-sectional view of a configuration of a first pixel of the liquid crystal display panel according to the first preferred embodiment.
Figure 4:
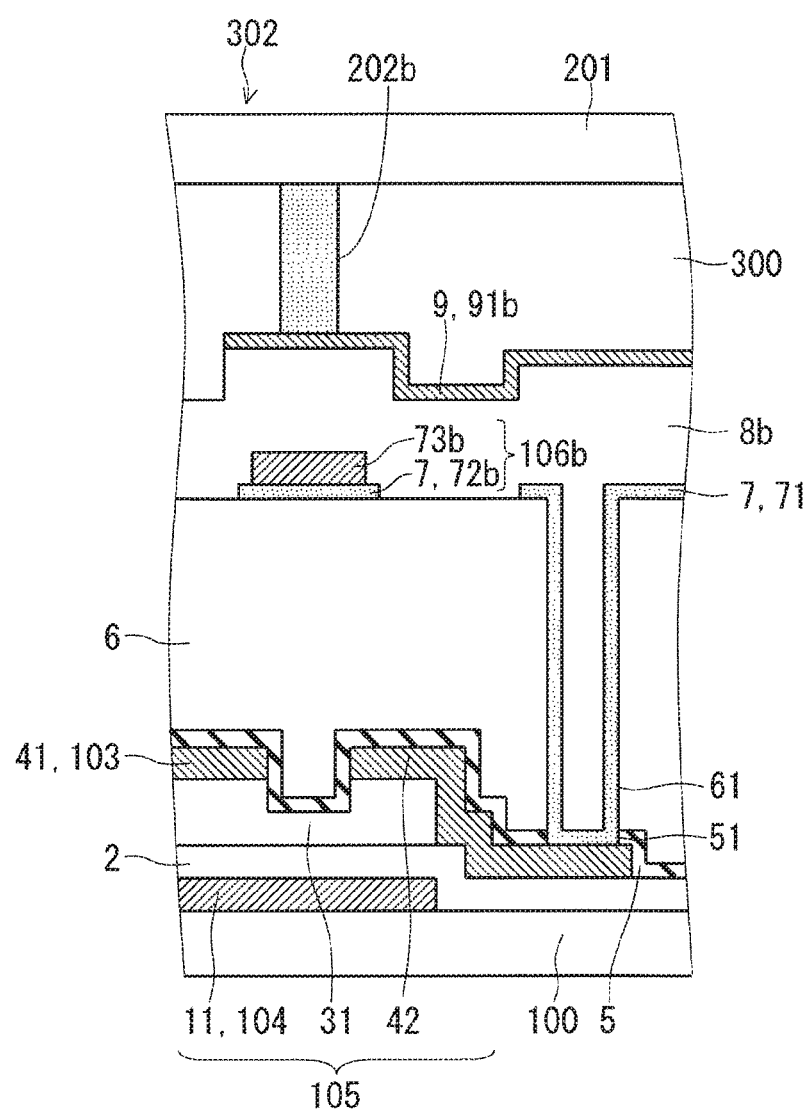
FIG. 4 is a cross-sectional view of a configuration of a second pixel of the liquid crystal display panel according to the first preferred embodiment.

FIG. 3 is a cross-sectional view taken along the line A-A of FIG. 2 and illustrates a configuration of the first pixel 301. FIG. 4 is a cross-sectional view taken along the line B-B of FIG. 2 and illustrates a configuration of the second pixel 302. FIG. 5 is a cross-sectional view taken along the line C-C and illustrates a configuration of the third pixel 303. Note that some of the elements are omitted in FIGS. 4 and 5. Similarly to the first pixel 301 including a pixel electrode 71 and a first common electrode 91a, the second pixel 302 illustrated in FIG. 4 includes the pixel electrode 71 and a second common electrode 91b. Similarly to the first pixel 301 including the pixel electrode 71 and the first common electrode 91a, the third pixel 303 illustrated in FIG. 5 includes the pixel electrode 71 and a third common electrode 91c.

As illustrated in FIGS. 3 to 5, the liquid crystal display according to the first preferred embodiment includes a liquid crystal layer 300, the transparent insulation substrate (first insulation substrate) 100, and a color filter substrate (second insulation substrate) 201, with the liquid crystal layer 300 being sandwiched between these substrates. The first pixel 301, the second pixel 302, and the third pixel 303 are provided on the transparent insulation substrate 100 and the color filter substrate 201. In the first preferred embodiment, a set of the first pixel 301 to the third pixel 303 is a set of RGB pixels. The proportions of these pixels to the display area 101 defined on the transparent insulation substrate 100 and the color filter substrate 201 can be expressed by $X+Y+Z=100$, $24 \leq X \leq 45$, $1 \leq Y \leq 22$, $54 \leq Z \leq 75$, where X represents the percentage of the first pixel 301, Y represents the percentage of the second pixel 302, and Z represents the percentage of the third pixel 303.

The configuration of the first pixel 301 will be firstly described below. Then, differences between the configuration of the first pixel 301 and the configuration of the second pixel 302 and differences between the configuration of the first pixel 301 and the configuration of the third pixel 303 will be described.

First Pixel 301

As illustrated in FIG. 3, in the first pixel 301, the pixel electrode 71 and the first common electrode 91a that are made of transparent conductive films overlap each other. The first common electrode 91a, which is the upper layer, has the slits (openings) 92a. When a voltage is applied between the pixel electrode 71 and the first common electrode 91a, an approximately horizontal electric field is generated in the liquid crystal layer 300 above the transparent insulation substrate 100. The approximately horizontal electric field drives the liquid crystal molecules in the liquid crystal layer 300 in a horizontal direction, so that the transmittance of the display area of each pixel is controlled. This allows a desired image to be displayed on the display area 101 including the display areas of the pixels. This means that the areas in which the pixel electrode 71 and the first common electrode 91a overlap each other are the display areas of the pixels.

A thin film transistor 105 serves as a switching element that allows selection between on and off in controlling the supply of display voltage. The thin film transistor 105 can apply, to the pixel electrode 71, a voltage based on signal data input from the outside to a source electrode 41 through the signal line 103 where appropriate. As illustrated in FIG. 2, in a plan view, the thin film transistor 105 is located at the intersection of the signal line 103 and the scanning line 104. In the first preferred embodiment, the thin film transistor 105 is connected to the intersection. As illustrated in FIG. 3, in a cross-sectional view, the individual thin film transistor 105 is located on the transparent insulation substrate 100 below the pixel electrode 71 and the first common electrode 91a.

As illustrated in FIGS. 2 and 3, the scanning line 104 is connected with a gate electrode 11 of the thin film transistor 105. The signal line 103 is connected with the source electrode 41 of the thin film transistor 105. The pixel electrode 71 is connected with a drain electrode 42 of the thin film transistor 105 through contact holes 51 and 61 that are in communication with each other. That is to say, the thin film transistor 105 is electrically connected to the signal line 103 and the scanning line 104.

As illustrated in FIG. 3, the first common electrode 91a is connected to the first common wire 106a through a contact hole 81. As illustrated in FIG. 2, the first common wire 106a is disposed so as to overlap the scanning line 104 in a plan view.

In the above-mentioned configuration, when a signal is provided (a voltage is applied) to the gate electrode 11 through the scanning line 104, a current flows from the source electrode 41 side to the drain electrode 42 side of the thin film transistor 105. Thus, the voltage based on signal data provided through the signal line 103 can be applied to the pixel electrode 71 side. The signal data is controlled, based on display data from the outside, by the IC chips 109 and the printed circuit board 110 connected to the terminal electrodes 108a and 108b illustrated in FIG. 1. The voltage based on the display data is applied to the signal line 103 accordingly.

The gate electrode 11 is located in each part on which the individual thin film transistor 105 is located, of the display area 101 of the transparent insulation substrate 100. In the first preferred embodiment, the gate electrode 11 is formed by extending the scanning line 104. As illustrated in FIG. 3, the gate electrode 11 and the scanning line 104 are covered with a gate insulation film 2. The gate insulation film 2 may be a silicon nitride (SiN) film.

Provided on the gate insulation film 2 above the gate electrode 11 is a semiconductor film 31, which is an island-shaped oxide semiconductor or an island-shaped silicon semiconductor made of amorphous silicon, microcrystalline silicon, or polycrystalline silicon, or including layers made of these types of silicon. The source electrode 41 lies directly on a source region of the semiconductor film 31 and the drain electrode 42 lies directly on a drain region of the semiconductor film 31, with a channel region being located between the source region and the drain region. The thin film transistor 105 has the above-mentioned configuration. In the first preferred embodiment, the source electrode 41 is formed by extending the signal line 103 on the gate insulation film 2.

The structure including the thin film transistor 105 and the signal line 103 is covered with a protective insulation film 5. The protective insulation film 5 includes, as a lower film that is in contact with the thin film transistor 105, an inorganic insulation film such as an SiN film or a silicon oxide (SiO) film. Provided on the protective insulation film 5 is an organic planarization film 6 (a planarization film 6) having insulation properties. The organic planarization film 6 is located on the thin film transistor 105 with the protective insulation film 5 therebetween. In this configuration, the protective insulation film 5 including an inorganic insulation film such as an SiN film can, for example, prevent moisture of the organic planarization film 6 from degrading properties of the thin film transistors 105.

The organic planarization film 6 is preferably an organic resin film mainly made of acrylic resin. Also, the organic planarization film 6 may be a spin-on-glass (SOG) film. The reason for this is that the dielectric constant c of each of the acrylic resin and the SOG film ranges from 3 to 4, which is smaller than the dielectric constant of the SiN film ranging from 6 to 7. The organic planarization film 6 that is the organic resin film mainly made of acrylic resin or the SOG film can reduce parasitic capacitance, and thus, the pixel electrode 71 is less likely to be affected by noise from the signal lines 103. This can improve the display quality. Similarly to the organic planarization film 6 being the SiN film, the organic planarization film 6 being the SiO film may fail to have a flat upper surface although the dielectric constant c of the SiO film is as low as that of the SOG film. In the case where the organic planarization film 6 has a flat upper surface, the pixel electrode 71 and the counter electrode can be disposed on the flat surface. Thus, the organic resin film mainly made of acrylic resin or the SOG film, whose upper surface can be easily flattened, is preferably used as the organic planarization film 6.

The organic planarization film 6 may be made of photosensitive material such that openings having a desired pattern can be formed in the organic planarization film 6 in the photolithography process. In this case, the contact hole 61 can be formed in the organic planarization film 6 above the drain electrode 42 in the photolithography process. Then, the protective insulation film 5 is dry etched to form the contact hole 51 using the organic planarization film 6 as an etching mask. That is to say, the protective insulation film 5 can be dry etched such that an opening is formed in the protective insulation film 5 below the opening of the organic planarization film 6.

Provided on the organic planarization film 6 are the pixel electrode 71 and a transparent conductive film wire 72a. Part (an extension) of the pixel electrode 71 is electrically connected to the surface of the drain electrode 42 of the thin film transistor 105 through the inner walls of the contact holes 51 and 61. The transparent conductive film wire 72a is separate from the pixel electrode 71. Provided on the transparent conductive film wire 72a is a metal wire 73a. To form the pixel electrode 71 and the transparent conductive film wire 72a, one first transparent conductive film 7 made of indium zinc oxide (IZO) or indium tin oxide (ITO) may be formed on the organic planarization film 6. Then, the first transparent conductive film 7 may be patterned to form the pixel electrode 71 and the transparent conductive film wire 72a.

The first common wire 106a has a laminated structure including the above-mentioned transparent conductive film wire (transparent conductive film) 72a that lies directly on the organic planarization film 6 and the above-mentioned metal wire (conductive film) 73a that lies directly on the transparent conductive film wire 72a. The first common wire 106a in this configuration includes the metal wire 73a having a relatively low resistance, and the first common wire 106a accordingly has a low resistance. As mentioned above, the first common wire 106a illustrated in FIG. 2 is located on the organic planarization film 6 so as to overlap the scanning line 104 in a plan view. That is to say, the first common wire 106a is located above the scanning line 104 included in the non-display area, thus preventing or minimizing an expansion of the non-display area including the first common wire 106a.

Provided on the pixel electrode 71 and the first common wire 106a is a first interlayer insulation film 8a. The first common electrode 91a formed of a second transparent conductive film 9 made of, for example, IZO or ITO is located on the first interlayer insulation film 8a so as to overlap the pixel electrode 71 in a plan view. The first common electrode 91a is electrically connected to the first common wire 106a through the contact hole 81 of the first interlayer insulation film 8a.

The configuration of the first pixel 301 on the transparent insulation substrate 100 side has been mainly described. The configuration of the first pixel 301 on the color filter substrate 201 side will now be described.

Provided on the color filter substrate 201 are a black matrix layer (not shown) for blocking entry of light into the areas other than the pixel areas and an RGB color filter layer (not shown) corresponding to the pixel areas. The color filter substrate 201 and the above-mentioned transparent insulation substrate 100 are assembled into a liquid crystal display panel.

In the first pixel 301, the color filter substrate 201 includes no columnar spacer equivalent to a first columnar spacer 202b in the second pixel 302 and a second columnar spacer 202c in the third pixel 303, which will be described below.

To sum up, the first pixel 301 includes the signal line 103, the scanning line 104, the thin film transistor 105, the organic planarization film 6, and the pixel electrode 71. The first pixel 301 also includes the first common wire 106a, the first interlayer insulation film 8a having the contact hole 81, and the first common electrode 91a. However, the first pixel 301 includes no columnar spacer.

Second Pixel 302

The structure of the second pixel 302 will now be described. Similarly to the first pixel 301 mentioned above, the second pixel 302 illustrated in FIGS. 2 and 4 includes the signal line 103, the scanning line 104, the thin film transistor 105, the organic planarization film 6, and the pixel electrode 71. As illustrated in FIG. 4, the second pixel 302 also includes the second common wire 106b, a second interlayer insulation film 8*b*, the second common electrode 91*b*, and the first columnar spacer 202*b*.

The second common wire 106*b* of the second pixel 302 has the same configuration as that of the first common wire 106*a* of the first pixel 301. Specifically, the second common wire 106*b* is located on the organic planarization film 6 and overlaps the scanning line 104 in a plan view. In the first preferred embodiment, provided as the second common wire 106*b* is a laminated structure including a transparent conductive film wire (transparent conductive film) 72*b* that lies directly on the organic planarization film 6 and a metal wire (conductive film) 73*b* that lies directly on the transparent conductive film wire 72*b*.

The second interlayer insulation film 8*b* is located on the pixel electrode 71 and the second common wire 106*b*. The second common electrode 91*b* formed of the second transparent conductive film 9 is located on the second interlayer insulation film 8*b* so as to overlap the pixel electrode 71 in a plan view. Unlike the first interlayer insulation film 8*a* (see FIG. 3) having the contact hole 81, the second interlayer insulation film 8*b* (see FIG. 4) has no contact hole below the first columnar spacer 202*b*, for electrical connection between the second common electrode 91*b* and the second common wire 106*b*. In this case, the second common electrode 91*b* is electrically floating. However, the distribution of the resistance of the first common electrode 91*a* and the second common electrode 91*b* can be sufficiently reduced by only the electrical connection between the first common wire 106*a* and the first common electrode 91*a* in the first pixel 301 as long as the first common electrode 91*a* is electrically connected to the second common electrode 91*b*.

The configuration of the second pixel 302 on the color filter substrate 201 side will now be described.

Provided on the color filter substrate 201 is the black matrix layer (not shown) for blocking entry of light into areas other than the pixel areas, the RGB color filter layer (not shown) corresponding to the pixel areas, and a plurality of first columnar spacers 202*b* of a uniform height.

The individual first columnar spacer 202*b* is connected (fixed) to the color filter substrate 201 above the thin film transistor 105. As mentioned above, the second interlayer insulation film 8*b* has no contact hole below the first columnar spacer 202*b*, and thus, the distance between the second common electrode 91*b* and the color filter substrate 201 is relatively short. The first columnar spacer 202*b* is in contact with both the second common electrode 91*b* and the color filter substrate 201 accordingly. The first columnar spacer 202*b* may be connected (fixed) to the second common electrode 91*b* instead of being connected (fixed) to the color filter substrate 201 above the thin film transistor 105.

Third Pixel 303

The configuration of the third pixel 303 will now be described. Similarly to the first pixel 301 and the second pixel 302 mentioned above, the third pixel 303 illustrated in FIGS. 2 and 5 includes the signal line 103, the scanning line 104, the thin film transistor 105, the organic planarization film 6, and the pixel electrode 71. As illustrated in FIG. 5, the third pixel 303 also includes a third interlayer insulation film 8*c*, the third common electrode 91*c*, and the second columnar spacer 202*c*. The third pixel 303 includes no common wire equivalent to the first common wire 106*a* or the second common wire 106*b* below the second columnar spacer 202*c*. The third pixel 303 may include one of the metal wire and the transparent conductive film that constitute the common wire, but not both. For example, as illustrated in FIG. 5, the third pixel 303 may include a transparent conductive film wire 72*c* similar to the transparent conductive film wire 72*a* or 72*b* and no metal wire similar to the metal wire 73*a* or 73*b*. Alternatively, the third pixel 303 may include a metal wire and no transparent conductive film wire 72*c* (not shown). In the first preferred embodiment, a common wire similar to the second common wire 106*b* is provided in the third pixel 303 except for the area in which the second columnar spacer 202*c* is located in a plane view (see FIG. 2). In this configuration, the metal wire extends over a relatively large area. Thus, an increase in resistance attributable to the absence of the common wire in part of the third pixel 303 is negligible because the increase is extremely small relative to the overall resistance of the first to third common electrodes 91*a* to 91*c*.

The third interlayer insulation film 8*c* is located on the pixel electrode 71 and the transparent conductive film wire 72*c*. In another configuration (not shown), the transparent conductive film wire 72*c* may not be provided. As a matter of course, the third interlayer insulation film 8*c* in this configuration does not overlie the transparent conductive film 72*c*.

The third common electrode 91*c* formed of the second transparent conductive film 9 is located on the third interlayer insulation film 8*c* so as to overlap the pixel electrode 71 in a plan view. The third interlayer insulation film 8*c* has no contact hole below the second columnar spacer 202*c*, for electrical connection between the third common electrode 91*c* and the common wire. In this case, the third common electrode 91*c* is electrically floating. However, the distribution of the resistance of the first common electrode 91*a* and the third common electrode 91*c* can be sufficiently reduced by only the electrical connection between the first common wire 106*a* and the first common electrode 91*a* in the first pixel 301 as long as the first common electrode 91*a* is electrically connected to the third common electrode 91*c*.

The configuration of the third pixel 303 on the color filter substrate 201 side will now be described.

Provided on the color filter substrate 201 are the black matrix layer (not shown) for blocking entry of light into the areas other than the pixel areas, the RGB color filter layer (not shown) corresponding to the pixel areas, and a plurality of second columnar spacers 202*c* of a uniform height.

The individual second columnar spacer 202*c* is located between the third common electrode 91*c* and the color filter substrate 201 above the thin film transistor 105 and is connected to the color filter substrate 201. In the first preferred embodiment, the height of the first columnar spacer 202*b* in the second pixel 302 is equal to the height of the second columnar spacer 202*c* in the third pixel 303.

The second columnar spacer 202*c* is connected (fixed) to the color filter substrate 201 above the thin film transistor 105. As mentioned above, the third interlayer insulation film 8*c* has no contact hole below the second columnar spacer 202*c*, and thus, the distance between the third common electrode 91*c* and the color filter substrate 201 is relatively short. However, no common wire is provided in the third pixel 303, so that the distance between the third common electrode 91*c* and the color filter substrate 201 is equivalent to the distance between the second common electrode 91*b* illustrated in FIG. 4 and the color filter substrate 201 extended by the distance corresponding to the thickness of the common wire. Thus, there is a gap between the second columnar spacer 202*c* and the third common electrode 91*c*. The second columnar spacer 202*c* may be connected (fixed) to the third common electrode 91*c* instead of being connected (fixed) to the color filter substrate 201 above the thin film transistor 105.

Manufacturing Method

FIGS. 6 to 9 are cross-sectional views illustrating a method for manufacturing the liquid crystal display panel according to the first preferred embodiment. Specifically, FIGS. 6 to 9 illustrate the processes required to form the first pixel 301. With reference to these drawings, the method for manufacturing the liquid crystal display panel according to the first preferred embodiment will now be described. The manufacturing method which will be described below involves seven photolithography processes.

Figure 6:
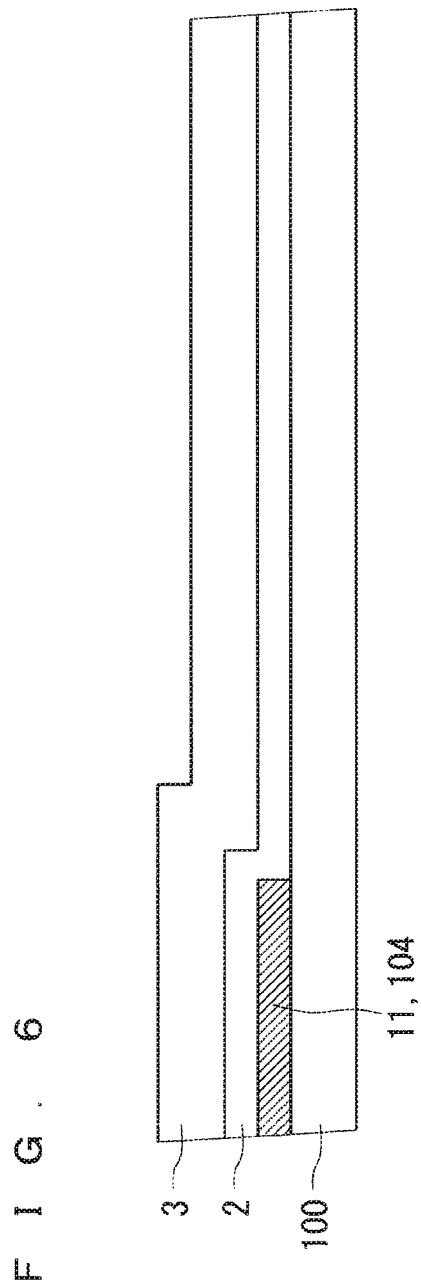

The following will firstly describe the process required to obtain a structure illustrated in FIG. 6. To form the transparent insulation substrate 100, a first metal film (not shown) is firstly deposited on, for example, a glass substrate by sputtering. The first metal film may be made of aluminum (Al), an aluminum alloy, or an alloy of Molybdenum (Mo), Chromium (Cr), Copper (Cu), and the like. Then, in a first photolithography process, a photoresist (not shown) which is a photosensitive resin is applied to the first metal film by, for example, spin coating. The applied photoresist is exposed and developed. The photoresist having a desired shape is formed by patterning. Subsequently, the first metal film is etched and patterned so as to have the desired shape, using the photoresist as an etching mask. Then, the photoresist is removed. The gate electrode 11 and the scanning line 104 are formed in the display area 101. The external wire 107 is formed so as to extend from the scanning line 104 through the frame area 102. The terminal electrodes 108a and 108b are formed in the terminal area. Then, the gate insulation film 2 and a semiconductor film 3 are sequentially deposited on both the above-mentioned wires and the transparent insulation substrate 100 by the plasma chemical vapor deposition (CVD) method. The gate insulation film 2 is, for example, an SiN film. Subsequently, the semiconductor film 3 is formed on the gate insulation film 2.

The following will describe the process required to obtain a structure illustrated in FIG. 7. In a second photolithography process, the semiconductor film 3 is patterned for the subsequent formation of the source region, the channel region, and the drain region of the thin film transistor 105. The semiconductor film 3 is etched, and then, the photoresist is removed, so that the semiconductor film 31 having an island shape is formed. Then, a second metal film (not shown) is deposited by sputtering. The second metal film may be made of aluminum (Al), aluminum alloy, or an alloy of Molybdenum (Mo), Chromium (Cr), Copper (Cu), and the like. In a third photolithography process, the second metal film is patterned so as to have the desired shape. The second metal film is etched, and then the photoresist is removed. The source electrode 41, the signal line 103, and the drain electrode 42 are formed in the display area 101. The external wire 107 is formed so as to extend from the signal line 103 through the frame area 102. The remaining part will be used as an etching stopper in the downstream process. The thin film transistor 105 is formed in the above-mentioned processes. Then, an SiN film, which is used as the protective insulation film 5 for covering the above-mentioned components, is deposited by the plasma CVD method.

Figure 8:
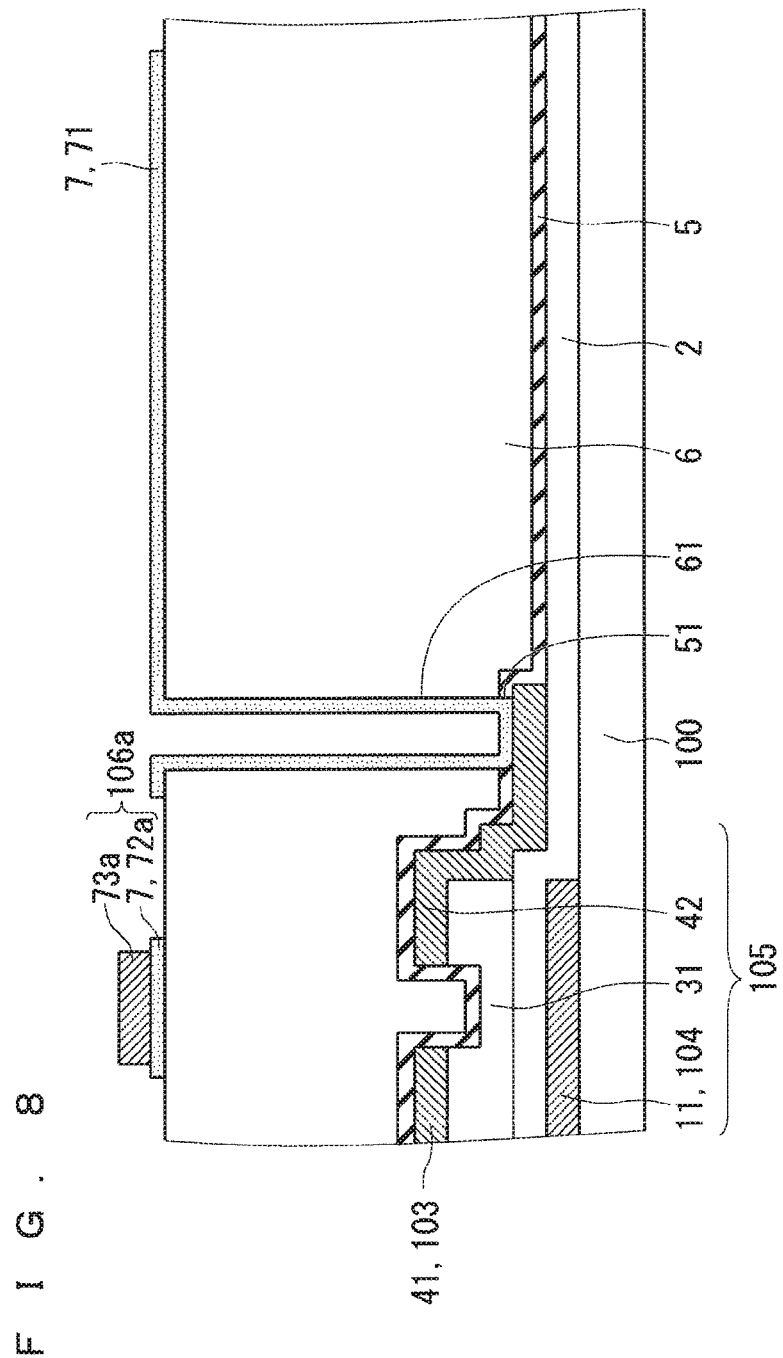

The following will describe the process required to obtain a structure illustrated in FIG. 8. The organic planarization film 6 having photosensitive properties is applied to the thin film transistor 105 by, for example, spin coating so as to have a thickness of 2 to 4 µm. In a fourth photolithography process, the organic planarization film 6 is exposed and developed. In the fourth photolithography process, the contact hole 61 is made and an opening is formed so as to extend over the entire terminal area and the periphery of the terminal area. Then, the protective insulation film 5 is dry etched, using the organic planarization film 6 as an etching mask. The drain electrode 42 and the remaining second metal film serve as etching stoppers in the contact hole 61 of the organic planarization film 6, the entire terminal area, and the periphery of the terminal area, so that only the protective insulation film 5 alone is etched. Although not shown in the drawing, not only the protective insulation film 5 but also the gate insulation film 2 is etched in the opening of the organic planarization film 6 on which no second metal film is located.

Subsequently, the first transparent conductive film 7 and a third metal film are sequentially deposited by sputtering. The first transparent conductive film 7 is formed on the inside of the contact holes 51 and 61 as well. The first transparent conductive film 7 is made of, for example, IZO or ITO. Although the third metal film may be made of any material, the second and third metal films are made of the same material or materials that can be patterned with the same etchant. Then, a fifth photolithography process is performed.

In the fifth photolithography process, a photoresist of uneven thickness is formed through patterning. In general, the thickness of a photoresist can be controlled based on the exposure amount corresponding to the transmittance of the photomask. In the first preferred embodiment, the photoresist of uneven thickness is formed by patterning, using an HT mask or a GT mask in which the transmittance varies from part to part. Although not shown in the drawing, such a photomask enables the removal of the photoresist from the light-transmissive area with a high transmittance during the development process. Most of the photoresist in the light-shielding area (light-shielding pattern region) remains unremoved, whereby a first photoresist is formed. A certain amount of photoresist is removed from an intermediate area in which the transmittance ranges between the transmittance in the light-transmissive area and the transmittance in the light-shielding area, whereby a second photoresist thinner than the first photoresist is formed.

The above-mentioned mechanism is applied to the first preferred embodiment, in which the first photoresist thicker than the second photoresist is formed in the area for forming the metal wires 73a and 73b and the transparent conductive film wires 72a and 72b, whereas the second photoresist thinner than the first photoresist is formed in the area for forming the pixel electrode 71 and the transparent conductive film wire 72c. Then, the third metal film is etched, using the first photoresist and the second photoresist as etching masks. The metal wires 73a and 73b are formed in the area for forming the transparent conductive film wires 72a and 72b. The third metal film is left in the area for forming the pixel electrode 71 and the transparent conductive film wire 72c.

Then, the second photoresist thinner than the first photoresist is completely removed by oxygen ashing, while the ashing time is adjusted such that part of the first photoresist thicker than the second photoresist is left in place. The laminated structure including the first photoresist and the metal wires 73a and 73b is left in the area for forming the transparent conductive film wires 72a and 72b. In the area for forming the pixel electrode 71 and the transparent conductive film wire 72c, the remaining third metal film is exposed.

Then, the first transparent conductive film 7 is etched, using the first photoresist, the metal wires 73a and 73b, the exposed third metal, and the like as etching masks. The pixel electrode 71 and the transparent conductive film wires 72a, 72b, and 72c are formed. Consequently, a first structure is formed in the first pixel 301, a second structure is formed in the second pixel 302, and a third structure is formed in the third pixel 303.

Subsequently, the exposed third metal film on the pixel electrode 71 and the transparent conductive film wire 72c is removed, using the first photoresist as an etching mask. Then, the first photoresist is removed.

The structure illustrated in FIG. 8 is obtained accordingly. The first common wire 106a in the first pixel 301 includes the transparent conductive film wire 72a and the metal wire 73a. The transparent conductive film wire 72a and the pixel electrode 71 are formed of one first transparent conductive film 7. Similarly, the second common wire 106b in the second pixel 302 includes the transparent conductive film wire 72b and the metal wire 73b. The transparent conductive film wire 72b and the pixel electrode 71 are formed of one first transparent conductive film 7. In a plan view, the transparent conductive film wire 72c is left in the position to which the second columnar spacer 202c of the third pixel 303 is to be joined.

Figure 9:
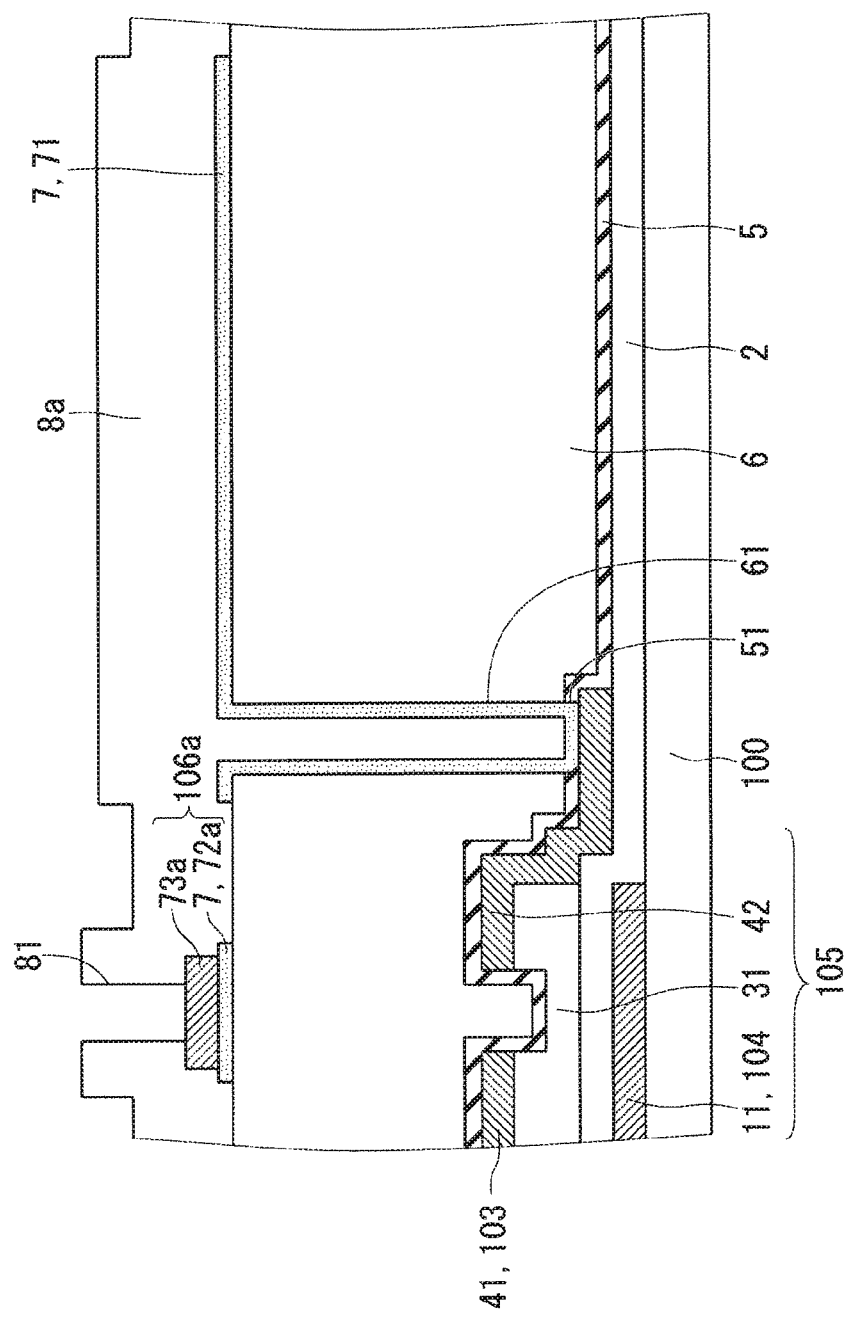

The following will described the process required to obtain a structure illustrated in FIG. 9. An SiN film, which is an interlayer insulation film to be used as the first to third interlayer insulation films 8a to 8c, is deposited on the structure illustrated in FIG. 8 (the pixel electrode 71, the first common wire 106a, the second common wire 106b, and the transparent conductive film wire 72c) by the plasma CVD method. In a sixth photolithography process, the interlayer insulation film is dry etched in only the first pixel 301 in the display area 101, whereby the contact hole 81 is formed. No contact holes are formed in the second pixel 302 and the third pixel 303.

Finally, the following will describe the process required to obtain the liquid crystal display panel illustrated in FIGS. 3 to 5. The second transparent conductive film 9 is deposited on the structure illustrated in FIG. 9 by sputtering. The second transparent conductive film 9 is formed on the inside of the contact hole 81 of the first interlayer insulation film 8a as well. The second transparent conductive film 9 is made of, for example, IZO or ITO. In a seventh photolithography process, the second transparent conductive film 9 is patterned so as to have the desired shape. The first to third common electrodes 91a to 91c are formed accordingly.

The following will describe the process required to form the color filter substrate 201. For example, a black matrix layer and an RGB color filter layer are formed on a glass substrate (not shown). Then, the first columnar spacers 202b and the second columnar spacers 202c of the same height are formed on the color filter substrate 201.

The color filter substrate 201 and the transparent insulation substrate 100 illustrated in FIG. 9 are assembled into a liquid crystal display panel. Although no columnar spacer is located above the thin film transistor 105 in the first pixel 301, the first columnar spacer 202b is located above the thin film transistor 105 in the second pixel 302 and the second columnar spacer 202c is located above the thin film transistor 105 in the third pixel 303. Then, liquid crystals are sealed between the color filter substrate 201 and the transparent insulation substrate 100, whereby the liquid crystal layer 300 is formed.

Conclusion

In the first preferred embodiment mentioned above, the first columnar spacer 202b and the second columnar spacer 202c are provided in the second pixel 302 and the third pixel 303, whereas no common wire (metal wire) is provided in the third pixel 303. The first columnar spacer 202b and the second columnar spacer 202c, each of which is equivalent of the other, produce the same effect as columnar spacers of different (here, two different) heights. The above-mentioned columnar spacers whose diameters are uniform can be processed, without the need for forming spacers with larger diameters. This can minimize degradation of quality (such as low contrast) of high-definition liquid crystal displays and the like. These columnar spacers can be formed without using a special HT mask or GT mask.

The common electrodes including the first common electrode 91a extend across the display area 101 of the liquid crystal display panel. If the common wire connected to this common electrode is formed of only the high-resistance first transparent conductive film 7, the applied voltage would fail to be consistent across the display area 101, causing a display failure. The first transparent conductive film 7 from which the pixel electrode 71 is to be formed is thin, whereas the organic planarization film 6 is thick. Consequently, the contact hole 61 is relatively deep. It is thus difficult to form the first transparent conductive film 7 evenly on the side wall of the contact hole 61. This may interfere with the normal voltage application, causing a display failure. This problem can be overcome by increasing the diameter of the contact hole 61. Unfortunately, the high aperture ratio may suffer in this configuration because the contact hole 61 is included in the non-display area.

In the first preferred embodiment, meanwhile, the first common wire 106a has a laminated structure including the transparent conductive film wire 72a and the metal wire 73a, and the second common wire 106b has a laminated structure including the transparent conductive film wire 72b and the metal wire 73b. This configuration provides the low-resistance first and second common wires 106a and 106b, so that the applied voltage can be consistent across the display area 101 and such a display failure is less likely to occur. Alternatively, the metal wire may be formed on the inside of the contact holes 61. This configuration, which has not been described above, allows the normal voltage application. The expansion of the non-display area and the degradation of the aperture ratio can be also minimized by the configuration in which the first common wire 106a and second common wire 106b overlap the scanning lines 104 in a plan view.

In the first preferred embodiment, the metal wires 73a and 73b do not lie directly on the organic planarization film 6. The metal wires 73a and 73b are located on the organic planarization film 6 with the transparent conductive film wires 72a and 73b therebetween. No additional work is needed to improve the adhesion of the metal wires to the organic planarization films, so that the manufacturing process becomes less burdensome. These metal wires are less likely to fall off, offering increased yield and improved reliability.

In another configuration, the metal wires 73a and 73b may be in contact with the common electrode instead of being in contact with the transparent conductive film wires 72a and 73b. In this configuration, however, an alignment film (not shown) may not be rubbed properly due to the irregularities in film thickness caused by the metal wires, whereby a display failure may occur. In the formation of slits such as the slits 92a, this configuration makes it difficult to control the size of the slits by exposing a slit pattern with a halftone transmittance. This configuration requires additional photolithography processes because the common electrode and the metal wires on the common wires need to be formed in different photolithography processes. The first preferred embodiment provides a workaround, in which the metal wires 73a and 73b are located on the organic planarization film 6 with the transparent conductive film wires 72a and 72b therebetween. The configuration according to the first preferred embodiment is suited to the structure of narrow-terminal electrodes.

In the first preferred embodiment, the proportions of the pixels to the display area 101 can be expressed by X+Y+Z=100, 24≤X≤45, 1≤Y≤22, 54≤Z≤75, where X represents the percentage of the first pixel 301, Y represents the percentage of the second pixel 302, and Z represents the percentage of the third pixel 303. This configuration can adequately produce the above-mentioned effects.

In the first preferred embodiment, the transparent conductive film wire 72a and the pixel electrode 71 are formed of one first transparent conductive film 7, and the transparent conductive film wire 72b and the pixel electrode 71 are formed of one first transparent conductive film 7. This configuration has an advantage in reducing manufacturing cost because these components can be formed in one photolithography process.

Modification

The lower electrode, which has been the pixel electrode in the configuration described in the first preferred embodiment, may be the common electrode. Each metal wire may lie directly on the common electrode, with no separate transparent conductive film wire therebetween. In this configuration, the upper electrode is the pixel electrode, which is connected to the drain electrodes of the thin film transistors through contact holes of the interlayer insulation film, the organic planarization film, and the protective insulation film.

In the first preferred embodiment, the metal wires 73a and 73b, the transparent conductive film wires 72a 72b, and 72c, and the pixel electrode 71 have been formed in one photolithography process, using the HT mask or the GT mask. Alternatively, normal masks may be used to form these components although additional photolithography processes are required.

Figure 10:
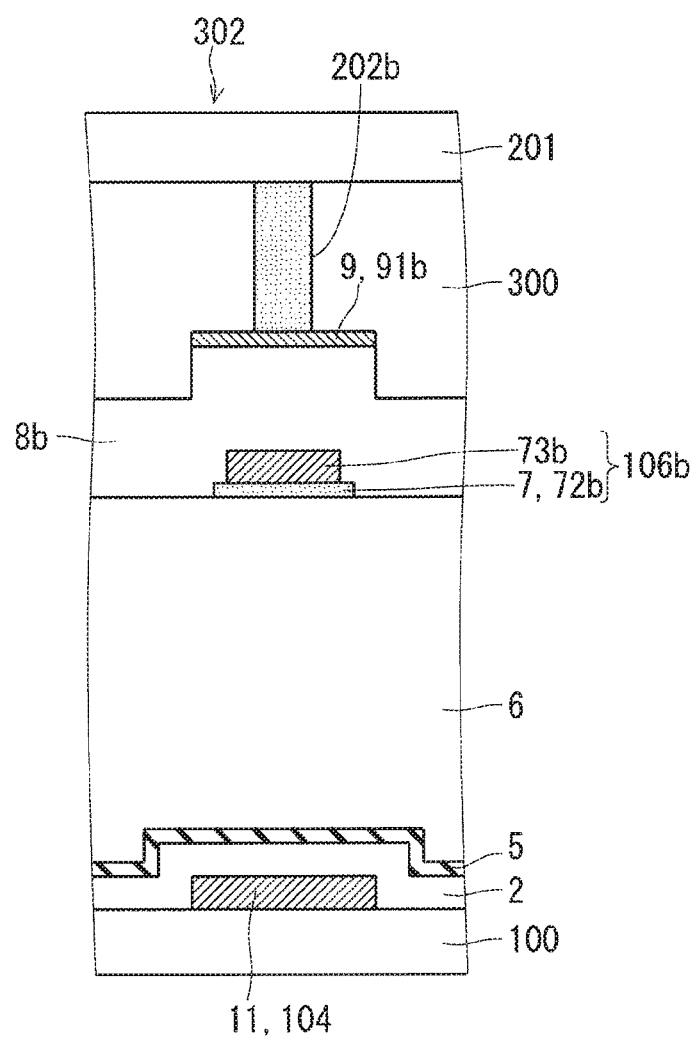
FIG. 10 is a cross-sectional view of a configuration of the second pixel of the liquid crystal panel according to a modification.

The first preferred embodiment has been described assuming that each of the first columnar spacer 202b and the second columnar spacer 202c is located above the thin film transistor 105. Alternatively, as illustrated in FIGS. 10 and 11, each of the first columnar spacer 202b and the second columnar spacer 202c may be located above the signal line 103 or the scanning line 104, whereby the same effects can be obtained. That is to say, each of the first columnar spacer 202b and the second columnar spacer 202c may be located above at least one of the thin film transistor 105, the signal line 103, and the scanning line 104.

In the present invention, the above preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display comprising:
   a liquid crystal layer; and
   a first insulation substrate and a second insulation substrate that sandwich said liquid crystal layer and include a first pixel, a second pixel, and a third pixel located thereon,
   each of said first pixel, said second pixel, and said third pixel including:
   one of a plurality of signal lines and one of a plurality of scanning lines, said plurality of signal lines and said plurality of scanning lines being arranged in matrix on said first insulation substrate;
   a thin film transistor that is located at an intersection of said signal line and said scanning line and is electrically connected to said signal line and said scanning line;
   a planarization film having insulation properties located on said thin film transistor; and
   a pixel electrode that is located on said planarization film and is electrically connected to said thin film transistor through a contact hole of said planarization film,
   wherein
   said first pixel includes:
   a first common wire that is located on said planarization film and overlaps said scanning line in a plan view;
   a first interlayer insulation film located on said pixel electrode and said first common wire; and
   a first common electrode located on said first interlayer insulation film and is electrically connected to said first common wire through a contact hole of said first interlayer insulation film,
   said second pixel includes:
   a second common wire that is located on said planarization film and overlaps said scanning line in a plan view;
   a second interlayer insulation film located on said pixel electrode and said second common wire;
   a second common electrode located on said second interlayer insulation film; and
   a first columnar spacer that is located above at least one of said thin film transistor, said signal line, and said scanning line and is connected to at least one of said second common electrode and said second insulation substrate,
   said second interlayer insulation film has no contact hole below said first columnar spacer,
   said third pixel includes:
   a third interlayer insulation film located on said pixel electrode;
   a third common electrode located on said third interlayer insulation film; and
   a second columnar spacer that is located above at least one of said thin film transistor, said signal line, and said scanning line and is connected to said third common electrode or said second insulation substrate,
   said third pixel includes no common wire equivalent to said first common wire or said second common wire below said second columnar spacer,
   said third interlayer insulation film has no contact hole below said second columnar spacer, and
   said first pixel includes no columnar spacer equivalent to said first columnar spacer or said second columnar spacer.

2. The liquid crystal display according to claim 1, wherein each of said first and second common wires has a laminated structure including:
   a transparent conductive film that lies directly on said planarization film; and
   a conductive film that lies directly on said transparent conductive film.

3. The liquid crystal display according to claim 2,
wherein said transparent conductive film and said pixel electrode are formed of one transparent conductive film.

4. The liquid crystal display according to claim 1,
wherein proportions of said first to third pixels to a display area defined on said first and second insulation substrates are expressed by
$X+Y+Z=100$, $24 \leq X \leq 45$, $1 \leq Y \leq 22$, $54 \leq Z \leq 75$,
where
X represents a percentage of said first pixel,
Y represents a percentage of said second pixel, and
Z represents a percentage of said third pixel.

5. The liquid crystal display according to claim 1,
wherein a height of said first columnar spacer is equal to a height of said second columnar spacer.

6. A method for manufacturing a liquid crystal display including a first insulation substrate and a second insulation substrate that sandwich a liquid crystal layer, said method comprising:
   a first forming step of forming a first structure, a second structure, and a third structure;
   said first forming step including
      (a) forming a plurality of signal lines and a plurality of scanning lines arranged in matrix on said first insulation substrate,
      (b) forming a thin film transistor at an intersection of one of said plurality of signal lines and one of said plurality of scanning line so as to electrically connect said thin film transistor to said signal line and said scanning line,
      (c) forming a planarization film having insulation properties on said thin film transistor, and
      (d) forming a pixel electrode on said planarization film so as to electrically connect said pixel electrode to said thin film transistor through a contact hole of said planarization film,
   a second forming step of forming a first pixel from said first structure;
   said second forming step including
      (e-1) forming a first common wire on said planarization film in such a manner that said first common wire overlaps said scanning line in a plan view,
      (f-1) forming a first interlayer insulation film on said pixel electrode and said first common wire, and
      (g-1) forming a first common electrode on said first interlayer insulation film so as to electrically connect said first common electrode to said first common wire through a contact hole of said first interlayer insulation film,
   a third forming step of forming a second pixel from said second structure; and
   said third forming step including
      (e-2) forming a second common wire on said planarization film in such a manner that said second common wire overlaps said scanning line in a plan view,
      (f-2) forming a second interlayer insulation film on said pixel electrode and said second common wire,
      (g-2) forming a second common electrode on said second interlayer insulation film, and
      (h-2) forming a first columnar spacer above at least one of said thin film transistor, said signal line, and said scanning line so as to connect said first columnar spacer to at least one of said second common electrode and said second insulation substrate,
   a fourth forming step of forming a third pixel from said third structure,
   said fourth forming step including
      (e-3) forming a third interlayer insulation film on said pixel electrode,
      (f-3) forming a third common electrode on said third interlayer insulation film, and
      (g-3) forming a second columnar spacer above at least one of said thin film transistor, said signal line, and said scanning line so as to connect said second columnar spacer to said third common electrode or said second insulation substrate,
   wherein
   in said first pixel, no columnar spacer equivalent to said first columnar spacer or said second columnar spacer is provided,
   in said second pixel, said second interlayer insulation film has no contact hole below said first columnar spacer, and
   in said third pixel, no common wire equivalent to said first common wire or said second common wire is located below said second columnar spacer and said third interlayer insulation film has no contact hole below said second columnar spacer.

7. The method for manufacturing a liquid crystal display according to claim 6,
wherein each of said first and second common wires is formed so as to have a laminated structure including:
   a transparent conductive film that lies directly on said planarization film; and
   a conductive film that lies directly on said transparent conductive film.

8. The method for manufacturing a liquid crystal display according to claim 7,
wherein said transparent conductive film and said pixel electrode are formed of one transparent conductive film.

9. The method for manufacturing a liquid crystal display panel according to claim 6,
wherein proportions of said first to third pixels to a display area defined on said first and second insulation substrates are expressed by
$X+Y+Z=100$, $24 \leq X \leq 45$, $1 \leq Y \leq 22$, $54 \leq Z \leq 75$,
where
X represents a percentage of said first pixel,
Y represents a percentage of said second pixel, and
Z represents a percentage of said third pixel.

10. The method for manufacturing a liquid crystal display according to claim 6,
wherein a height of said first columnar spacer is equal to a height of said second columnar spacer.

* * * * *